US006749174B2

(12) United States Patent
Bircann et al.

(10) Patent No.: US 6,749,174 B2
(45) Date of Patent: Jun. 15, 2004

(54) EXHAUST GAS RECIRCULATION VALVE HAVING LOW DRAG

(75) Inventors: Raul A. Bircann, Penfield, NY (US); Jerry L. Kelly, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/236,739

(22) Filed: Sep. 6, 2002

(65) Prior Publication Data

US 2004/0046141 A1 Mar. 11, 2004

(51) Int. Cl.[7] ................................................ F16K 31/02
(52) U.S. Cl. ................................... 251/129.15; 251/214
(58) Field of Search ............................ 251/129.15, 214; 123/568.11

(56) References Cited

U.S. PATENT DOCUMENTS

| | | | | | |
|---|---|---|---|---|---|
| 6,062,536 | A | * | 5/2000 | Bircann | 251/129.15 |
| 6,193,211 | B1 | * | 2/2001 | Watanabe et al. | 123/568.24 |
| 6,217,001 | B1 | * | 4/2001 | Gluchowski et al. | 251/129.07 |
| 2001/0032630 | A1 | | 10/2001 | Bircann et al. | 123/568.11 |
| 2001/0032950 | A1 | | 10/2001 | Bircann et al. | 251/129.15 |
| 2001/0032953 | A1 | | 10/2001 | Bircann et al. | 251/214 |
| 2002/0104978 | A1 | | 8/2002 | Bircann et al. | 251/129.15 |

FOREIGN PATENT DOCUMENTS

| | | | |
|---|---|---|---|
| EP | 1130246 | A2 | 5/2001 |

* cited by examiner

*Primary Examiner*—John Bastianelli
(74) *Attorney, Agent, or Firm*—Patrick M. Griffin

(57) ABSTRACT

A pintle-type valve including a valve body enclosing a chamber having a first port surrounded by an annular valve seat in a first wall of the chamber and a second port in a second and opposite wall of the chamber for receiving a pintle bushing. A valve pintle shaft having an attached valve head is disposed in the bushing. The second port is larger in diameter than the diameter of the valve head, so that the valve head may be admitted to the chamber through the port. The bushing is radially floating in the port and has a flange extending along an outer surface of the valve body for forming a seal therewith. The pintle extends into a conventional solenoid-type actuator bolted to the valve body. A radially-floating gas seal surrounds the pintle between the retainer and the actuator. A compressed coil spring holds the bushing in place against operating pressure within the valve chamber. The bushing and gas seal are centered by the valve stem, reducing frictional drag and reducing valve leakage.

6 Claims, 3 Drawing Sheets

EXHAUST GAS RECIRCULATION VALVE HAVING LOW DRAG

TECHNICAL FIELD

The present invention relates to exhaust gas recirculation (EGR) pintle valves for internal combustion engines; more particularly, to such valves which are inwardly-opening; and most particularly, to such a valve wherein drag on the valve pintle shaft is minimized during actuation thereof.

BACKGROUND OF THE INVENTION

Pintle valves are well known for use in controlling flow of fluids, and especially gases. An important use is for recirculating a portion of the exhaust gas from an internal combustion engine into the intake manifold thereof.

Current gas flow valves wherein a valve head is inwardly withdrawn into a chamber from a valve seat typically include a valve pintle bushing pressed into a bore in a valve wall opposite the valve seat. Because of high operating pressures in the valve chamber, the wall containing the bushing is typically a removable plate which is bolted onto the valve body after the bushing and valve pintle/head are installed. Such a large plate typically is gasketed to minimize gas leakage. Due to necessary tight clearances for the pintle in the bushing and the plurality of other components common to current EGR control valves, misalignment of the pintle and head with respect to the valve seat is virtually inevitable. The valve head must center itself in the seat, thereby exerting torque on a misaligned bushing which causes frictional drag on the pintle shaft as it moves through the bushing. Further, a gas shield for preventing leakage of exhaust gas into the solenoid actuator, if not very highly aligned with the pintle shaft, causes addition drag on the shaft during actuation. Typically, such parasitic losses require that a solenoid actuator for a prior art valve be undesirably large and power-consuming.

Further, such misalignments can result in significant leakage of gases to the exterior of the valve, whereas government regulations on emission are becoming ever stricter.

What is needed in the art is a means for allowing a pintle shaft bushing and a shaft gas seal to be radially floating and therefore self-aligning to reduce the power required to actuate the valve and to reduce emissions from the valve.

It is a principal object of the present invention to reduce the power required to operate an EGR valve by reducing frictional losses of actuation within the valve mechanism.

It is a further object of the present invention to reduce exhaust leakage from an EGR valve.

It is a still further object of the present invention to reduce the number of components of an EGR valve and to simplify assembly thereof.

SUMMARY OF THE INVENTION

Briefly described, a pintle-type valve in accordance with the invention includes a valve body enclosing a chamber. A first port surrounded by an annular valve seat is provided in a first wall of the body. A second port is formed in a second and opposite wall of the body coaxially with the first port for receiving a pintle bushing from outside the valve body. A valve pintle shaft, having an attached valve head for mating with the valve seat, is disposed in a close-fitting central bore in the bushing. The second port has a diameter larger than the diameter of the valve head, so that the valve head may be admitted to the chamber through the port. The bushing is radially floating in the port, has a flange extending along an outer surface of the valve body for forming a seal therewith, and is approximately centered and retained by a bushing retainer. The pintle extends into a conventional solenoid-type actuator which is attached to the valve body. A radially-floating gas seal surrounds the pintle between the retainer and the actuator. A compressed coil spring surrounding the pintle between the gas seal and the bushing holds the bushing in place against operating pressure within the valve chamber.

BRIEF DESCRIPTION OF THE DRAWINGS

The present invention will now be described, by way of example, with reference to the accompanying drawings, in which.

DESCRIPTION OF THE PREFERRED EMBODIMENTS

The novelty and advantages conferred by the invention may be better appreciated by first considering a prior art pintle-type valve.

Figure 1:
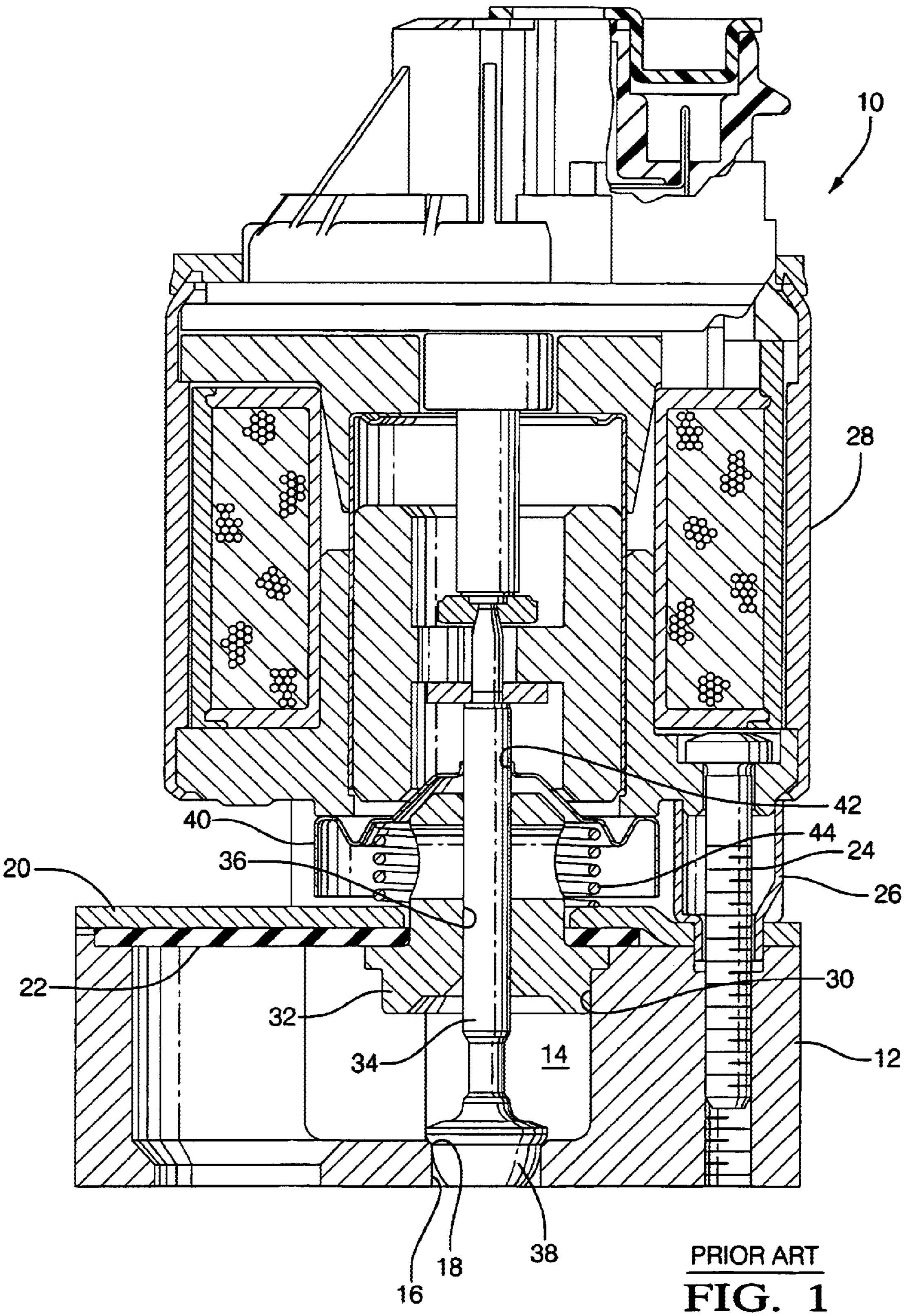
PRIOR ART FIG. 1
FIG. 1 is an elevational cross-sectional view of a prior art pintle-type valve.

Referring to FIG. 1, a prior art pintle-type valve assembly 10 includes a valve body 12 comprising a first chamber 14 and having a first port 16 surrounded by an annular valve seat 18. Chamber 14 is closed by plate 20 which is gasketed to body 12 by a resilient gasket 22. Plate 20 is secured to body 12 via a plurality of bolts 24 acting through hollow standoffs 26 to also secure solenoid actuator 28 thereto. A second port 30 in valve body 12 is opposite to and coaxial with first port 16 and is receivable of an axially elongate pintle shaft bushing 32 which is pressed into port 30 and retained therein by plate 20 to resist its being expelled by pressure in chamber 14. Pintle shaft 34 is disposed for reciprocating motion in an axial bore 36 in bushing 32 and extends in a first direction into actuator 28. In a second direction, shaft 34 is provided with a valve head 38 within chamber 14 for mating coaxially with valve seat 18. A cup-shaped gas seal 40 having a central opening 42 close-fitting to shaft 34 is disposed between plate 20 and actuator 28 and is urged against actuator 28 by a coil spring 44 disposed in compression between plate 20 and seal 40.

As discussed above, normal manufacturing variation in the dimensions and locations of the valve body, the chamber, the ports, the bushing and its bore, and the gas seal result in some unavoidable degree of misalignment and consequent drag on the pintle shaft during actuation by the solenoid. It is a primary objective of the invention to reduce such drag by providing a bushing and a gas seal arrangement which can float radially to be centered automatically by the pintle shaft itself in response to centering of the valve head in the valve seat.

Figure 2:
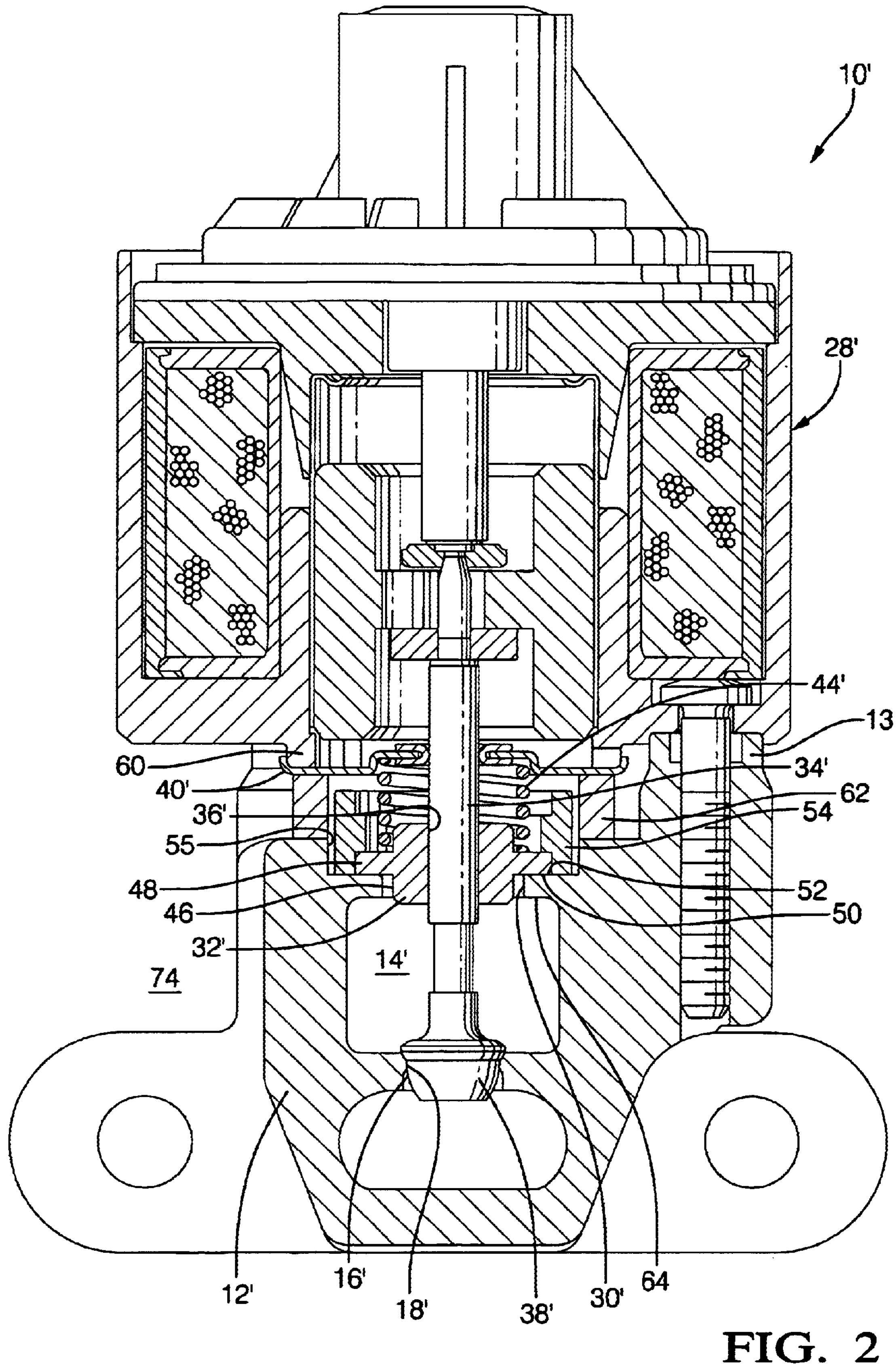
FIG. 2 is an elevational cross-sectional view of a novel pintle-type valve in accordance with the invention.
Figure 4:
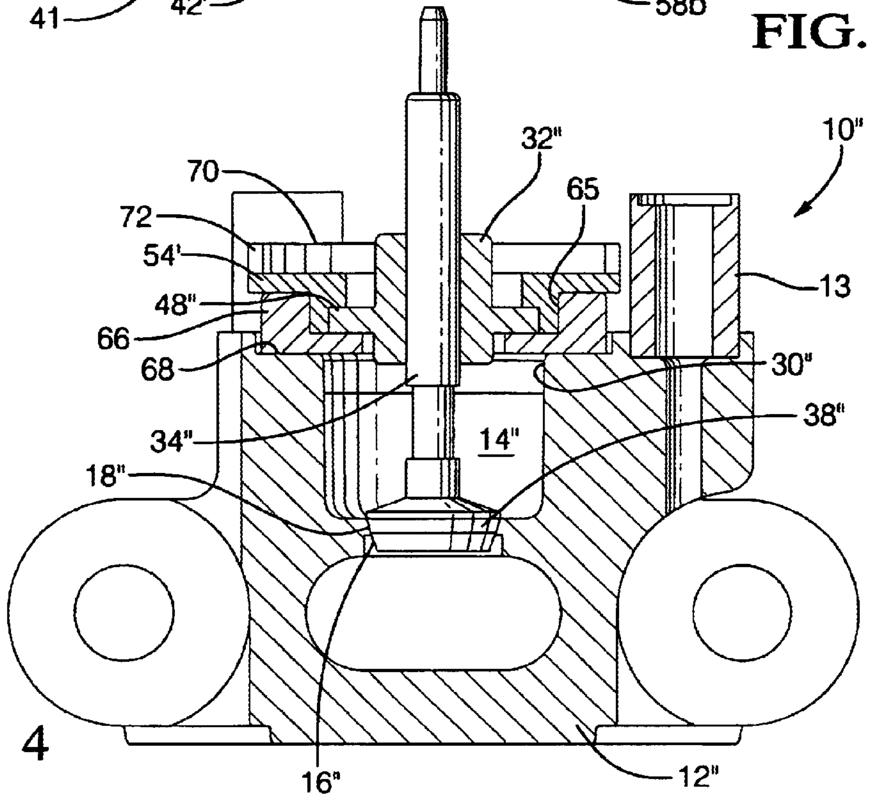
FIG. 4 is an elevational cross-sectional view of a second embodiment of a valve in accordance with the invention.
Figure 5:
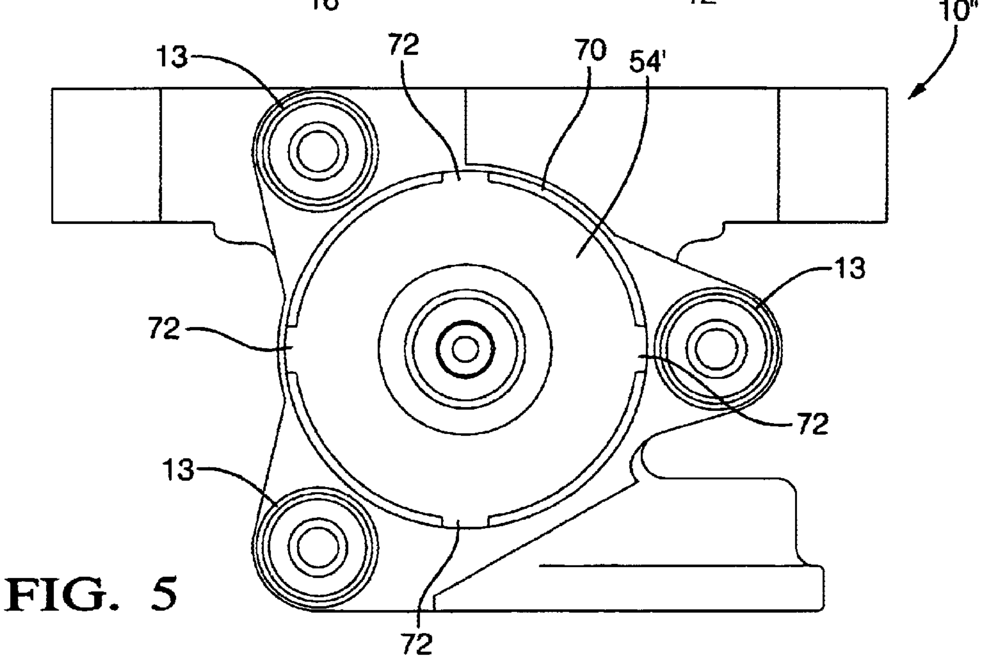
FIG. 5 is a plan view of the valve shown in FIG. 4.

Referring to FIG. 2, an improved pintle-type valve assembly 10' includes a valve body 12' comprising a first chamber 14' and having a first port 16' surrounded by an annular valve seat 18'. A second port 30' in valve body 12' is opposite to and coaxial with first port 16' and is receivable of a pintle shaft bushing 32' having a first diameter 46 which is smaller than the diameter of second port 30' such that bushing 32' may be radially displaced within port 30'. Bushing 32' is provided with an equatorial flange 48 having a diameter greater than the diameter of second port 30'. A first surface 50 of flange 48 is matable with a surface 52 of valve body 12' to form a seal against leakage from chamber 14'. Annular bushing retainer 54 is disposed around flange 48 and has an inner diameter slightly greater than the outer diameter of flange 48. Bushing retainer 54 is pressed into a shallow well 55 in valve body 12'. Preferably, the radial clearance and axial clearance between flange 48 and retainer 54 are each about 0.3 mm to permit free movement of bushing 32' over a very small range of motion. Pintle shaft 34' is disposed for reciprocating motion in an axial bore 36' in bushing 32' and extends in a first direction into actuator 28'. In a second direction, shaft 34' is provided with a valve head 38' within chamber 14' for mating coaxially with valve seat 18', second port 30' being large enough in diameter to admit valve head 38' to chamber 14'. Solenoid 28' is secured to body 12' via a plurality of bolts 24', preferably three. Preferably, body 12' is formed having a plurality of threaded legs 13, as shown in FIGS. 2, 4 and 5, replacing hollow standoffs 26.

Figure 3:
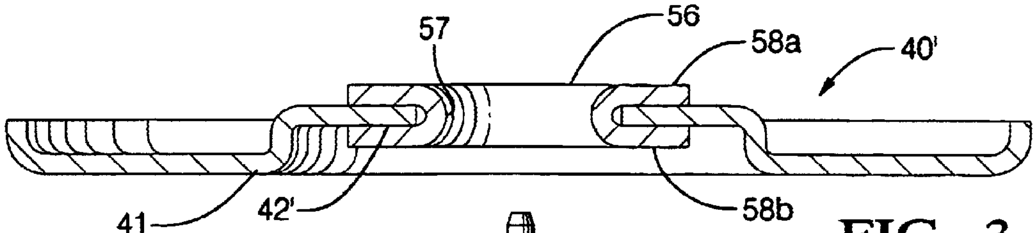
FIG. 3 is an elevational cross-sectional view of a radially-compliant gas shaft seal in accordance with the invention.

Referring to FIGS. 2 and 3, a gas seal assembly 40' comprises a formed element 41 having a central opening 42' loosely retaining a grommet 56 which is close-fitting to shaft 34', preferably with nearly zero clearance thereto. Grommet 56 has first and second flared rims **58*a*, 58*b* extending along the respective surfaces of element 41. Grommet 56 includes shaft opening 57 that is closely fitted axially to element 41 to minimize gas leakage therebetween but is loosely fitted radially within opening 42' to permit radial adjustment of grommet 56 within stationary element 41**.

Gas seal assembly 40' is disposed against an annular flange 60 on actuator 28' and is urged against actuator 28' by a coil spring 44' disposed in compression between bushing flange 48 and seal assembly 40'. Preferably, for use of valve assembly 10' as an exhaust gas recirculation valve in an engine 74, spring 44' has a spring force in excess of about 200 kPa, to retain bushing 32' within port 30' without leakage against a pressure within chamber 14' of typically about 140 kPa or less.

Preferably, a cylindrical screen element 62 is captured between seal assembly 40' and valve body 12', as shown in FIG. 2. Preferably, element 62 comprises a wire mesh for keeping external debris out of the valve assembly but permitting ready exhaust of any gases leaking around or through bushing 32'.

Referring to FIGS. 4 and 5, a portion of second embodiment 10" of a pintle-type valve in accordance with the invention is shown. The arrangement of a valve body 12", chamber 14", first port 16", seat 18", pintle shaft 34", valve head 38", and pintle bushing 32" is substantially the same as previously discussed under embodiment 10'. However, chamber 14" is not formed having valve body return portions 64 (shown in FIG. 2); rather second port 30" is simply an extension of the wall of chamber 14". Thus, a bushing adaptor 66 is required, being pressed into a shallow well 68 in body 12" and having the same radial clearance to bushing 32" as shown in embodiment 10'. An axial seal is thus formed between bushing flange 48" and adaptor 66, analogous to the seal formed in embodiment 10'. A bushing retainer 54' is pressed into well 65 of adaptor 66. Retainer 54' is formed having a raised rim 70 for collecting gas condensate which may leak past bushing 32", and having one or more slots 72 in rim 70 to allow spontaneous drainage of any such condensate.

An advantage of a valve in accordance with the present invention is a substantial reduction in exhaust gas emissions. When valve assembly 10' was tested against prior art valve assembly 10, an eight-fold reduction in valve exhaust emissions was observed.

A further advantage is a substantial reduction in frictional drag on the pintle shaft during actuation thereof, thereby reducing the power required for actuation and permitting use of an actuator 28' smaller than actuator 28.

A still further advantage is a reduction in total parts required. Embodiment 10' eliminates 3 standoffs, a gasket, and a plate, and adds a bushing retainer, metal mesh filter, and a grommet, for a net reduction of two components. Assembly is also simplified.

Further, since variations in the compressed length of spring 44' due to assembly tolerances has no affect on the radial forces exerted by gas shield grommet on the pintle shaft, as the variations did in the prior art, body 12' can be welded to solenoid actuating assembly 28'. Thus a further reduction in total part count can be realized.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A pintle type valve, comprising:

a) a valve body containing at least one chamber;

b) a first port in said chamber;

c) a valve seat surrounding said first port;

d) a second port in said chamber opposite said first port, said second port having a port diameter;

e) a pintle shaft bushing disposed in said second port and having a first portion smaller in diameter than said second port diameter and having a flange portion larger in diameter than said second port diameter and extending beyond said second port outside said valve body;

f) a valve pintle shaft axially disposed in said bushing and extending into said chamber;

g) a valve head disposed on said shaft for mating with said valve seat;

h) a solenoid actuator attached to said valve body and engaged with said pintle shaft for axial actuation thereof;

i) a coil spring disposed in compression between said actuator and said bushing for retaining said bushing in said second port against operating pressure within said chamber; and j) an annular gas seal having a fixed element with a central opening for receiving a grommet having a shaft opening for close-fitting admission of said valve pintle shaft, said grommet being close-fitting to said fixed element in an axial direction and loosely fitting to said fixed element in a radial direction.

2. A pintle type valve in accordance with claim 1 further comprising a screen element disposed between said actuator and said valve body.

3. A pintle type valve in accordance with claim 1 further comprising a bushing retainer disposed in a well in said valve body and surrounding said flange portion of said bushing.

4. A pintle type valve in accordance with claim 3 further comprising a radial clearance between said bushing retainer and said bushing of less than about 0.5 mm.

5. A pintle type valve in accordance with claim 1 wherein said spring has a compressed force of at least about 200 kPa.

6. An internal combustion engine, comprising a pintle-type exhaust gas recirculation valve having a valve body containing at least one chamber, a first port in said chamber, a valve seat surrounding said first port, a second port in said chamber opposite said first port, said second port having a port diameter, a pintle shaft bushing disposed in said second port and having a first portion smaller in diameter than said second port diameter and having a flange portion larger in diameter than said second port diameter and extending beyond said second port outside said valve body, a valve pintle shaft axially disposed in said bushing and extending into said chamber, a valve head disposed on said shaft for mating with said valve seat, a solenoid actuator attached to said valve body and engaged with said pintle shaft for axial actuation thereof, an annular gas seal disposed between said valve body and said actuator having a fixed element with a central opening for receiving a grommet having a shaft opening for close-fitting admission of said valve pintle shaft, said grommet being close-fitting to said fixed element in an axial direction and loosely fitting to said fixed element In a radial direction, and a coil spring disposed in compression between said gas seal and said bushing for retaining said bushing in said second port against operating pressure within said chamber.

* * * * *